(12) United States Patent
Jo

(10) Patent No.: US 11,451,968 B2
(45) Date of Patent: Sep. 20, 2022

(54) METHOD FOR TRANSMITTING AND RECEIVING DISCOVERY BURST IN SHARED BAND

(71) Applicant: ELECTRONICS AND TELECOMMUNICATIONS RESEARCH INSTITUTE, Daejeon (KR)

(72) Inventor: Gyung Hyun Jo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 10 days.

(21) Appl. No.: 16/879,747

(22) Filed: May 20, 2020

(65) Prior Publication Data

US 2020/0374703 A1 Nov. 26, 2020

(30) Foreign Application Priority Data

May 21, 2019 (KR) .......................... 10-2019-0059757
Apr. 27, 2020 (KR) .......................... 10-2020-0050787
May 20, 2020 (KR) .......................... 10-2020-0060503

(51) Int. Cl.
*H04W 16/14* (2009.01)
*H04W 74/08* (2009.01)
*H04W 72/04* (2009.01)

(52) U.S. Cl.
CPC ....... *H04W 16/14* (2013.01); *H04W 72/0446* (2013.01); *H04W 72/0453* (2013.01); *H04W 74/0808* (2013.01)

(58) Field of Classification Search
CPC ............ H04W 16/14; H04W 72/0446; H04W 72/0453; H04W 74/0808
See application file for complete search history.

(56) References Cited

U.S. PATENT DOCUMENTS

| 9,166,729 | B2 | 10/2015 | Gomadam et al. |
| 11,140,695 | B1 * | 10/2021 | Eyuboglu .......... H04W 72/0433 |
| 2016/0212647 | A1 * | 7/2016 | Mo .................... H04W 48/12 |
| 2018/0062806 | A1 | 3/2018 | Jung et al. |

(Continued)

FOREIGN PATENT DOCUMENTS

| EP | 3471296 A1 | 4/2019 | |
| WO | WO-2017066803 A1 * | 4/2017 | .......... H04W 72/044 |
| WO | 2019027180 A1 | 2/2019 | |

*Primary Examiner* — Brian P Cox
(74) *Attorney, Agent, or Firm* — Rabin & Berdo, P.C.

(57) ABSTRACT

A method for transmitting a discovery burst according to an exemplary embodiment of the present disclosure may comprise performing first channel-sensing with respect to a shared band to transmit the discovery burst through first window of discovery pattern first duration including the first window to N-th window; in case that the shared band is determined to be not-occupied based on the first channel-sensing, transmitting the discovery burst through the first window of the discovery pattern first duration; performing second channel-sensing with respect to the shared band to transmit the discovery burst through second window of discovery pattern second duration including first window to N-th window; and in case that the shared band is determined to be not-occupied based on the second channel-sensing, transmitting the discovery burst through the second window of the discovery pattern second duration.

13 Claims, 12 Drawing Sheets

(56) References Cited

U.S. PATENT DOCUMENTS

| | | |
|---|---|---|
| 2018/0124789 A1* | 5/2018 | Yerramalli .......... H04W 72/048 |
| 2019/0021071 A1 | 1/2019 | Islam et al. |
| 2019/0037481 A1 | 1/2019 | Zhang et al. |
| 2019/0053174 A1 | 2/2019 | Nangia et al. |
| 2019/0081721 A1 | 3/2019 | Ly et al. |
| 2019/0090210 A1 | 3/2019 | Islam et al. |

* cited by examiner

METHOD FOR TRANSMITTING AND RECEIVING DISCOVERY BURST IN SHARED BAND

CROSS-REFERENCE TO RELATED APPLICATIONS

This application claims priority to Korean Patent Applications No. 10-2019-0059757 filed on May 21, 2019, No. 10-2020-0050787 filed on Apr. 27, 2020, and No. 10-2020-0060503 filed on May 20, 2020 with the Korean Intellectual Property Office (KIPO), the entire contents of which are hereby incorporated by reference.

BACKGROUND

1. Technical Field

The present disclosure relates to a method for transmitting and receiving discovery burst in a shared band, and more specifically, to a method for transmitting and receiving discovery burst so that inter-cell interferences are avoided in a shared band.

2. Related Art

The International Mobile Telecommunications-2020 (IMT-2020) required a high transmission speed (e.g., enhanced Mobile BroadBand (eMBB)), a short transmission latency (e.g., Ultra Reliable Low Latency Communication (URLLC)), and a massive terminal connectivity (e.g., massive machine type communication (mMTC)) as three key performance indicators for $5^{th}$ generation (5G) communications. The $3^{rd}$ Generation Partnership Project (3GPP) has been developing a standard that satisfies the above-described performance indicators for the 5G communications, and recently announced a standard called a New Radio (NR).

The NR standardization phase 1 (i.e., NR Phase-1) has ended with release of the NR Release-15, and study or work items such as NR-unlicensed (NR-U) are being discussed in the NR standardization phase 2 (i.e., NR Phase-2). The NR-U is a technology that uses an unlicensed frequency spectrum, and shares an unlicensed band with a Wi-Fi device, or the like.

The devices sharing the unlicensed band coexist in the corresponding unlicensed band while keeping a rule such as List-Before-Talk (LBT). That is, before a transmission device transmits a signal or data through the unlicensed band, the transmission device first checks whether other devices are using the unlicensed band. When the unlicensed band is in an idle state (or, 'not-occupied' state) in which other devices are not using the corresponding unlicensed band (i.e., in case of an 'LBT success'), the transmission device may transmit the signal or data through the unlicensed band. On the other hand, when the unlicensed band is in an occupied state (or, 'busy' state) in which other devices are using the corresponding unlicensed band (i.e., in case of an 'LBT failure'), the transmission device may not use the corresponding unlicensed band.

Meanwhile, in the NR-U, in addition to a non-standalone mode in which a primary cell using a licensed band and an auxiliary cell using an unlicensed band are operated simultaneously, standard specifications are being developed to support a standalone mode in which only an unlicensed band is operated independently. Unlike the non-standalone mode, more problems are expected in the standalone mode because the unlicensed band should be shared with a plurality of devices without assistance of a licensed band connection. For example, when small cells using the same unlicensed band are deployed adjacently, an LBT success rate may be lowered due to interferences between the small cells operating in the standalone mode.

SUMMARY

Accordingly, exemplary embodiments of the present disclosure provide methods for transmitting and receiving discovery burst so that interferences between adjacent cells are avoided in an unlicensed or shared band.

According to a first exemplary embodiment of the present disclosure, a method for a transmission node to transmit a discovery burst in shared band may comprise performing first channel-sensing with respect to the shared band to transmit the discovery burst through a first window of a discovery pattern first duration including the first window to an N-th window, N being a natural number equal to or greater than 2; in case that the shared band is determined to be not-occupied based on the first channel-sensing, transmitting the discovery burst through the first window of the discovery pattern first duration; performing second channel-sensing with respect to the shared band to transmit the discovery burst through a second window of a discovery pattern second duration including a first window to an N-th window; and in case that the shared band is determined to be not-occupied based on the second channel-sensing, transmitting the discovery burst through the second window of the discovery pattern second duration.

According to a second exemplary embodiment of the present disclosure, a method for a reception node to receive a discovery burst in shared band may comprise receiving configuration information on a variable discovery pattern from a transmission node; monitoring a first window of a discovery pattern first duration including the first window to an N-th window to receive the discovery burst during the discovery pattern first duration, N being natural number equal to or greater than 2; and monitoring a second window of a discovery pattern second duration including a first window to an N-th window to receive the discovery burst during the discovery pattern second duration.

According to a third exemplary embodiment of the present disclosure, a transmission node transmitting discovery burst in shared band may comprise a processor; and a memory storing program command, wherein the processor executing the program command to cause the transmission node to: perform first channel-sensing with respect to the shared band; in case that the shared band is determined to be not-occupied based on the first channel-sensing, transmit the discovery burst through a first window of a discovery pattern first duration including the first window to an N-th window, N being natural number equal to or greater than 2; perform second channel-sensing with respect to the shared band; and in case that the shared band is determined to be not-occupied based on the second channel-sensing, transmit the discovery burst through a second window of a discovery pattern second duration including a first window to an N-th window.

According to the exemplary embodiments of the present disclosure, a transmission/reception success rate of discovery burst can be increased by applying a method of transmitting and receiving the discovery burst so that interferences between adjacent cells are avoided.

BRIEF DESCRIPTION OF DRAWINGS

Exemplary embodiments of the present disclosure will become more apparent by describing in detail embodiments of the present disclosure with reference to the accompanying drawings, in which.

Figure 1:
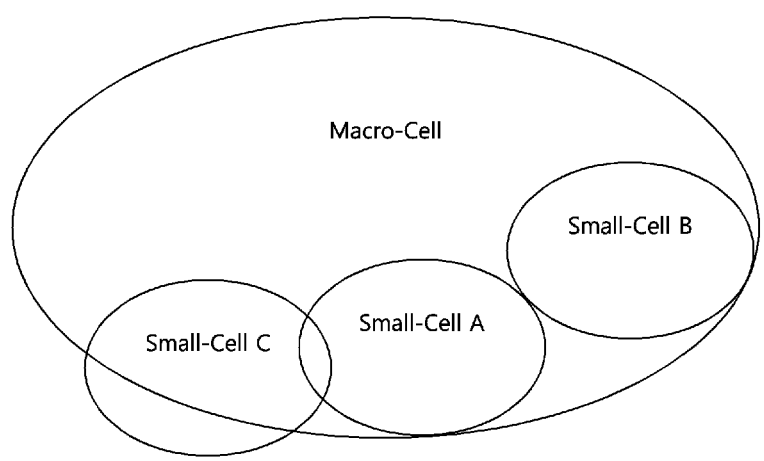
FIG. 1 is a diagram illustrating arrangement of small cells using an unlicensed band.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

The term 'unlicensed band' in the present disclosure may mean a non-exclusive frequency band, not a frequency band used exclusively by an operator by obtaining a license from an authority. The present disclosure is not limited only to case of unlicensed band and is applied broadly to any shared frequency band that can be used by a plurality of subjects together although it belongs to a licensed band.

The term 'cell' in the present disclosure may mean a regional coverage of the base station. Alternatively, when a plurality of cells are integrated and operated through a carrier aggregation function or a dual connectivity function, the meaning of 'cell' may not match the regional coverage of the base station.

Hereinafter, various exemplary embodiments of the present disclosure will be described with reference to the drawings.

FIG. 1 is a diagram illustrating arrangement of small cells using an unlicensed band.

As shown in FIG. 1, a small cell A (i.e., Small-Cell A) and a small cell B (i.e., Small-Cell B) are disposed adjacent to each other in coverage of a macro cell (i.e., Macro-Cell) using a licensed band.

The macro cell and the small cell B may provide communication services to reception nodes (e.g., terminals in case of downlink transmission) within the coverage through the dual connectivity function. That is, the macro cell may act as a master cell using the licensed band, and the small cell B may act as a secondary cell using an unlicensed band, so that the communication services may be provided through the dual connectivity function. Even when the small cell B fails to occupy the unlicensed band due to an LBT failure at a critical moment, it may be possible to transmit an important signal or data through the master cell using the licensed band.

The small cell A may provide communication services to reception nodes within the coverage using the carrier aggregation function. In this case, the base station may provide communication services by carrier-aggregating a primary cell (e.g., Small-Cell A #1) using the licensed band and an auxiliary cell (e.g., Small-Cell A #2) using the unlicensed band. Here, in order to avoid mutual interferences, the licensed band used by the primary cell (e.g., Small-Cell A #1) of the base station may be different from the licensed band used by the macro cell. As described above, in the non-standalone mode in which the primary cell using the licensed band (e.g., Small-Cell A #1) and the auxiliary cell (e.g., Small-Cell A #2) using the unlicensed band are operated simultaneously, even when the auxiliary cell (e.g., Small-Cell A #2) fails to occupy the unlicensed band due to the LBT failure at the critical moment, it may be possible to transmit the important signal or data through the primary cell (e.g., Small-Cell A #1) using the licensed band.

On the other hand, the small cell A may operate in the standalone mode using only an unlicensed band, and may provide communication services to reception nodes within the coverage. In this case, since the communication services should be provided without assistance of a licensed band connection, if an LBT fails at the critical moment, the important signal or data may not be transmitted. Frequent or continuous failing to transmit the important signal, such as a synchronization signal that needs to be transmitted periodically, may cause significant performance degradation.

When the small cell A operating in the standalone mode and a small cell C (e.g., Small-Cell C) operating in the standalone mode share the same unlicensed band, periodical signal transmissions of the small cell C through the corresponding unlicensed band may be a cause of periodic LBT failures of the small cell A. Conversely, the periodic signal transmissions of the small cell A through the corresponding unlicensed band may be a cause of periodic LBT failures of the small cell C. When the signal transmission periodicities of the two small cells coincide coincidentally, periodic mutual interferences may occur between the two small cells (e.g., Small-Cell A and Small-Cell C), which may adversely decrease the LBT success rate of either one of the two small cells. In particular, when two small cells (e.g., Small-Cell A and Small-Cell C) sharing the same unlicensed band are operated by different operators, the above problem may become more serious.

Figure 2:
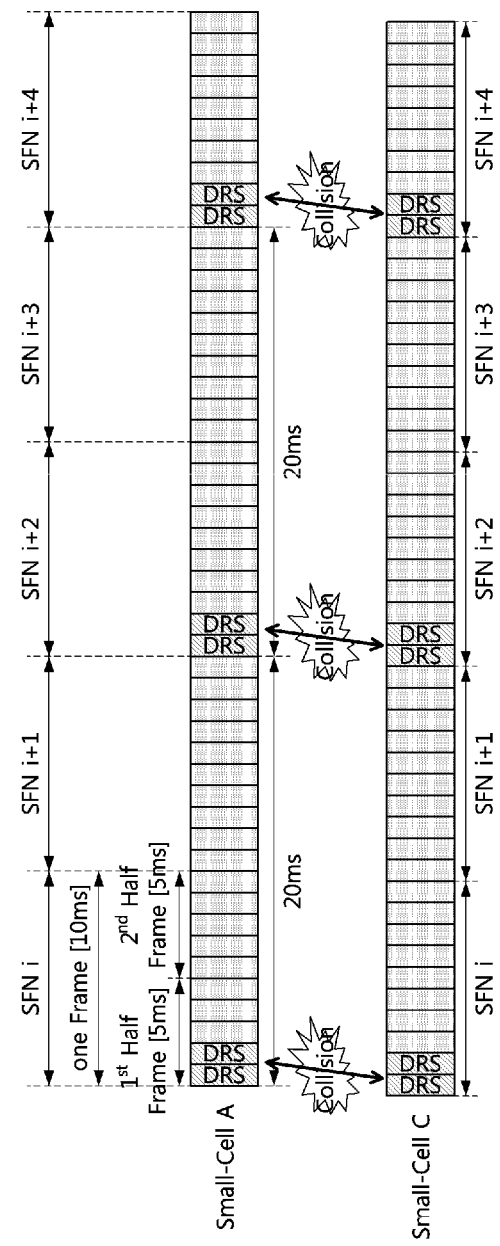
FIG. 2 is a diagram illustrating periodic mutual interferences between adjacent cells.

FIG. 2 is a diagram illustrating periodic mutual interferences between adjacent cells.

Figure 3:
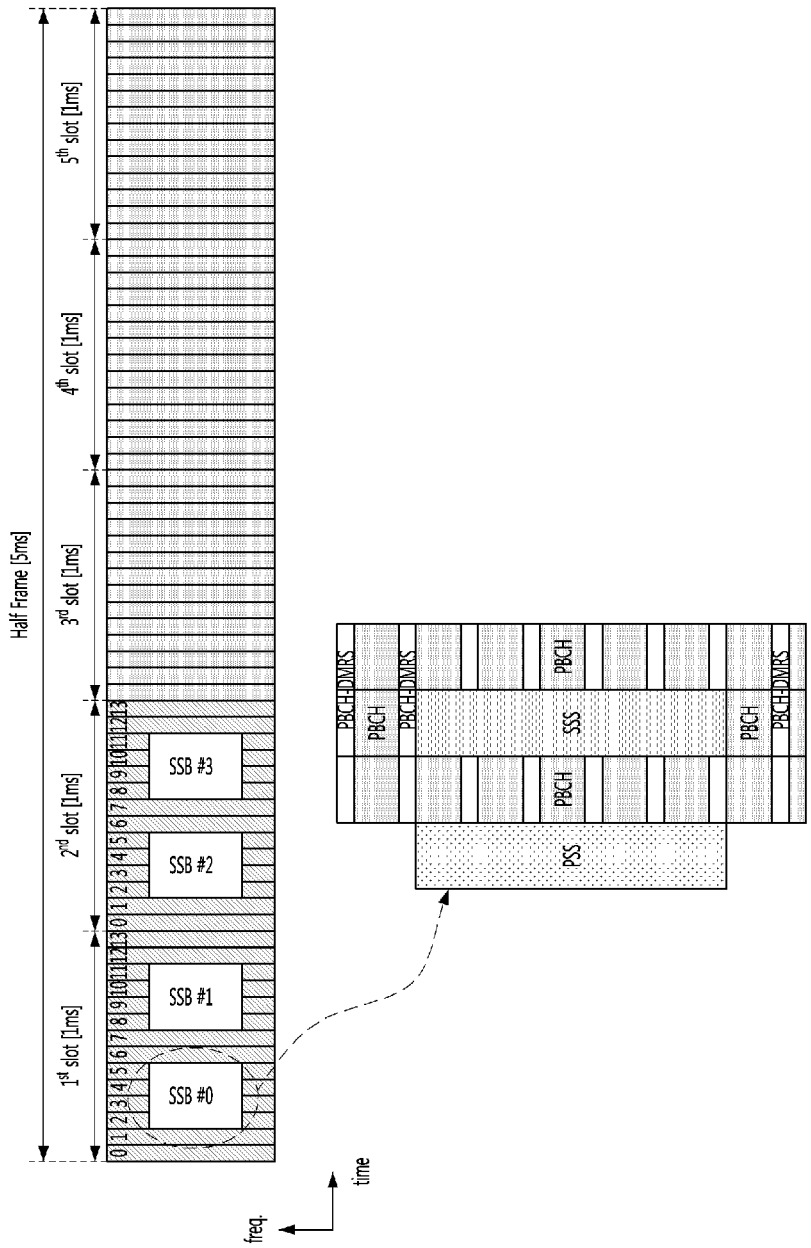
FIG. 3 is a diagram illustrating in detail the first half frame and the discovery burst in FIG. 2.

As shown in FIG. 2, the small cell A (Small-Cell A) may transmit a discovery burst (i.e., discovery reference signal (DRS) burst) with a periodicity of 20 ms. The DRS may be a signal including a synchronization signal, system information, a reference signal, and the like, and may be used for synchronization acquisition, channel measurement, and the like. The details thereof are illustrated in FIG. 3. In FIG. 2, a time length of each frame (i.e., SFN i, SFN i+1, SFN i+2, SFN i+3, and SFN i+4) may be 10 ms, and one frame may comprise a first half frame (i.e., $1^{st}$ Half Frame) and a second half frame (i.e., $2^{nd}$ Half Frame).

The drawings from FIG. 2 illustrate specific time values such as 20 ms, 10 ms, 5 ms, 1 ms, etc., but they are only for illustrative and understanding purposes, and the present disclosure is not limited to the exemplary embodiment using such the specific time values. For example, unlike in FIG. 2, the exemplary embodiments of the present disclosure may be applied even when the discovery burst is transmitted with a periodicity of 10 ms or 30 ms.

As shown in FIG. 2, the small cell C (Small-Cell C) may transmit a discovery burst with a periodicity of 20 ms identically to the small cell A. In FIG. 2, it is assumed that the small cell C and the small cell A share the same unlicensed band. As shown in FIG. 2, periodic mutual interferences may occur when the discovery burst transmission timing of the small cell C and the discovery burst transmission timing of the small cell A are partially or totally overlapped. More specifically, when the LBT timing of the small cell C is slightly ahead of the LBT timing of the small cell A as shown in FIG. 2, if further intervention of other devices are not present, the small cell C may continue to succeed in its LBT procedure at each discovery burst transmission timing, and may periodically transmit the discovery burst, whereas the small cell A may continue to fail in its LBT procedure at each discovery burst transmission timing. That is, the periodic discovery burst transmissions of the small cell C may act as a cause of periodic interferences to the small cell A, which may cause the continuous LBT failures.

The exemplary embodiments of the present disclosure provide schemes that can reduce such continuous LBT failures. The above has explained mainly about the case of unlicensed band, however the exemplary embodiments of the present disclosure are not limited only to case of unlicensed band and is applied broadly to any shared band case where a plurality of subjects may use a licensed band (or an unlicensed band) together as the shared band. For example, in case of Device to Device (D2D) communication, Vehicle to Everything (V2X) communication, or Sidelink communication which is performed using the licensed band and is performed out of coverage of a base station, a periodic interference as the above can occur and the exemplary embodiments of the present disclosure provide schemes that can reduce such a periodic interference.

FIG. 3 is a diagram illustrating in detail the first half frame and the discovery burst in FIG. 2.

As shown in FIG. 3, the half frame of 5 ms may consist of 5 slots (e.g., $1^{st}$ slot, $2^{nd}$ slot, $3^{rd}$ slot, $4^{th}$ slot, and $5^{th}$ slot), and each slot may have a length of 1 ms and may comprise 14 symbols. However, the present disclosure is not limited to such the specific exemplary embodiment, and the present disclosure may be applied to exemplary embodiments having different time values according to numerology, subcarrier spacing, cyclic prefix (CP) length, or the like of the communication system. In addition, the time unit names, such as 'frame', 'half frame', 'slot', and 'symbol', may vary depending on the communication system. For example, the time unit composed of 14 symbols may be called as a 'subframe' in one communication system or a 'slot' in another communication system. The exemplary embodiments of the present disclosure are not limited to a specific communication system using a specific time unit name, and may be applied to various communication systems. For example, the time unit names such as 'frame', 'half frame', 'slot', and 'symbol' may be referred to as a first time unit, a second time unit, a third time unit, and a fourth time units, respectively.

In FIG. 3, the first slot (i.e., $1^{st}$ slot) may include two synchronization signal blocks (SSB #0 and SSB #1), and the second slot (i.e., $2^{nd}$ slot) may also include two SSBs (SSB #2 and SSB #3). A term 'discovery signal unit' used in the present disclosure may be interpreted as a meaning of collective inclusion of at least one SSB, which is included in a slot, and a physical downlink control channel (PDCCH), a physical downlink shared channel (PDSCH), a channel state information-reference signal (CSI-RS), and the like which may be selectively included in the corresponding slot. The discovery burst in FIG. 3 may include two discovery signal units. In a different view, the discovery burst in FIG. 3 may include four synchronization signal blocks (e.g., SSB #0, SSB #1, SSB #2, and SSB #3).

In FIG. 3, a specific structure of the SSB #0 is shown. The corresponding synchronization signal block SSB #0 may include a primary synchronization signal (PSS), a secondary synchronization signal (SSS), a physical broadcast channel (PBCH), and a PBCH-demodulation reference signal (PBCH-DMRS). The PSS and SSS may be signals transmitted for synchronization acquisition, and the PBCH and the PBCH-DMRS may be used for transmission of system information. The PBCH (together with the PBCH-DMRS) may include an SSB index, a half frame indication value (e.g., Half Frame bit), a system frame number (SFN), and the like. The SSB index (e.g., #0, #1, #2, and #3) may change for each SSB. The half frame indication value may indicate whether the corresponding SSB is located in the first half frame or the second half frame. The SFN may change for each frame. A terminal that has received a certain SSB may identify the corresponding synchronization timing by combining the SSB index, the half frame indication value, and the SFN obtained from the received SSB.

Figure 4:
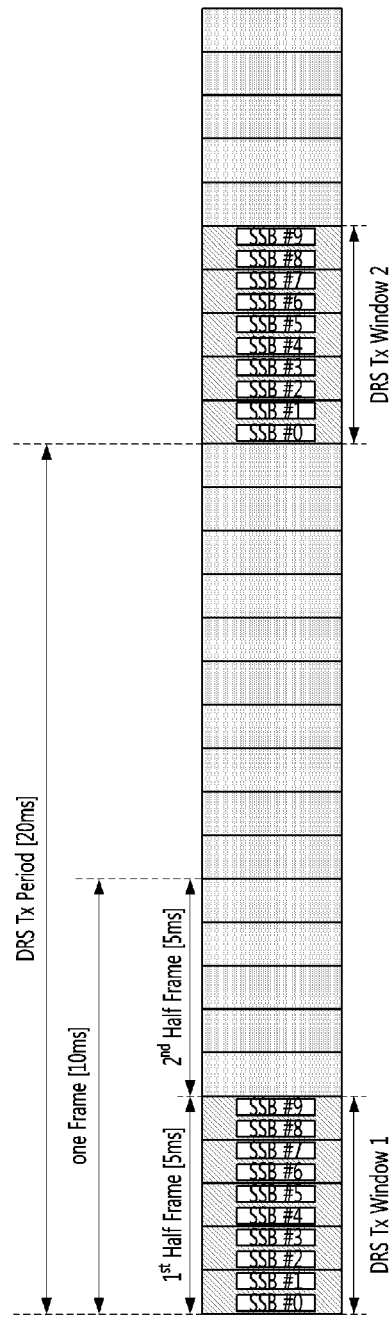
FIG. 4 is an exemplary diagram illustrating a discovery burst.

FIG. 4 is an exemplary diagram illustrating a discovery burst.

In FIG. 4, a discovery transmission period (i.e., DRS Tx Period) may be 20 ms, and a discovery transmission window (i.e., DRS Tx Window) may be 5 ms. However, it is also possible to configure the discovery transmission period to have a time length greater than 20 ms or a time length less than 20 ms, and to configure the discovery transmission window to have a time length less than 5 ms or a time length greater than 5 ms.

The term 'discovery burst' used in the present disclosure may be interpreted as a meaning of collective inclusion of at least one discovery signal unit(s) that are continuously or non-continuously arranged through a discovery transmission window (DRS Tx Window). The discovery burst in FIG. 4 may include five discovery signal units which are arranged continuously. In a different view, the discovery burst in FIG. 4 may include 10 synchronization signal blocks (e.g., SSB #0, SSB #1, SSB #2, SSB #3, SSB #4, SSB #5, SSB #6, SSB #7, SSB #8, and SSB #9). Here, the meaning that the discovery burst includes 10 synchronization signal blocks may be interpreted as that the discovery burst includes 10 synchronization signal block candidate positions. The transmission node (e.g., a base station in downlink transmission and a terminal in uplink transmission) may actually transmit all 10 synchronization signal blocks at the respective corresponding candidate positions, but the number of synchronization signal blocks actually transmitted may be less than 10 according to whether an LBT in each candidate position is successful or not. In addition, the positions of the synchronization signal blocks actually transmitted within any one discovery transmission window (DRS Tx Window) may be irregular according to the LBT success location, the operation mode, the limit of the maximum number of SSBs, the limit of the maximum number of actually transmitted SSBs, other conditions or settings, or the like. The number of synchronization signal blocks actually transmitted within one discovery transmission window (DRS Tx Window) may also be irregular.

Meanwhile, it may also be included in the concept of discovery burst transmission that only one synchronization signal block is transmitted in any one discovery transmission window (DRS Tx Window). In addition, the synchronization signal blocks actually transmitted may not need to be continuous synchronization signal blocks. The synchronization signal blocks may discontinuously be transmitted within any one discovery transmission window (DRS Tx Window) according to whether the LBT is successful, the LBT success location, the operation mode, the limit of the maximum number of SSBs, the limit of the maximum number of actually transmitted SSBs, or other conditions or settings, or the like. The discontinuous transmission of the synchronization signal blocks may also be included in the concept of discovery burst transmission.

When the synchronization signal blocks actually transmitted in the first discovery transmission window (DRS Tx Window 1) of FIG. 4 have a regular pattern of (SSB #0, SSB #2, SSB #4, and SSB #6), and the synchronization signal blocks actually transmitted in the second discovery transmission window (DRS Tx Window 2) of FIG. 4 have the same regular pattern of (SSB #0, SSB #2, SSB #4, and SSB #6), it may be considered that the same regular transmission pattern is repeated for each discovery transmission window.

When the synchronization signal blocks actually transmitted in the first discovery transmission window (DRS Tx Window 1) of FIG. 4 have an irregular pattern of (SSB #0, SSB #3, SSB #4, and SSB #9), and the synchronization signal blocks actually transmitted in the second discovery transmission window (DRS Tx Window 2) of FIG. 4 have the same irregular pattern of (SSB #0, SSB #3, SSB #4, and SSB #9), it may be considered that the same irregular transmission pattern is repeated for each discovery transmission window.

When the synchronization signal blocks actually transmitted in the first discovery transmission window (DRS Tx Window 1) of FIG. 4 have a regular pattern of (SSB #0, SSB #3, SSB #6, and SSB #9), and the synchronization signal blocks actually transmitted in the second discovery transmission window (DRS Tx Window 2) of FIG. 4 have an irregular pattern of (SSB #4, SSB #7, and SSB #9), it may be considered that one of different transmission patterns is applied to each discovery transmission window without repetition of the same transmission pattern.

Figure 5:
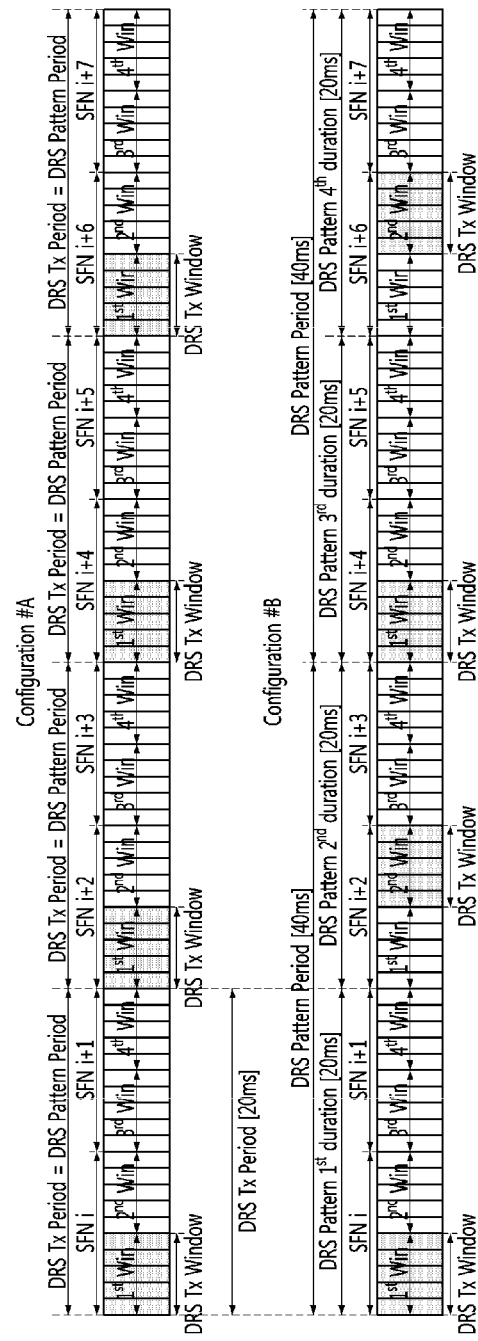
FIG. 5 illustrates alternate arrangement of discovery transmission windows according to an exemplary embodiment of the present disclosure.

FIG. 5 illustrates alternate arrangement of discovery transmission windows according to an exemplary embodiment of the present disclosure.

In FIG. 5, a fixed discovery pattern (i.e., configuration #A) and a variable discovery pattern (i.e., configuration #B) are shown.

In the fixed discovery pattern (i.e., configuration #A), a discovery transmission period (DRS Tx Period) and a discovery pattern period (DRS Pattern Period) may coincide, and in FIG. 5, both of the discovery transmission period (DRS Tx Period) and the discovery pattern period (DRS Pattern Period) have a value of 20 ms. In the fixed discovery pattern (i.e., configuration #A) in FIG. 5, the discovery transmission period (DRS Tx Period) may include a first window ($1^{st}$ Win), a second window ($2^{nd}$ Win), a third window ($3^{rd}$ Win), and a fourth window ($4^{th}$ Win). In the fixed discovery pattern (i.e., configuration #A) in FIG. 5, the first window (i.e., $1^{st}$ Win) may always correspond to a discovery transmission window (DRS Tx Window) in the discovery transmission period (DRS Tx Period) (or, discovery pattern period (DRS Pattern Period)) from a frame SFN i to a frame SFN i+1, in the discovery transmission period (DRS Tx Period) (or, discovery pattern period (DRS Pattern Period)) from a frame SFN i+2 to a frame SFN i+3, in the discovery transmission period (DRS Tx Period) (or, discovery pattern period (DRS Pattern Period)) from a frame SFN i+4 to a frame SFN i+5, and in the discovery transmission period (DRS Tx Period) (or, discovery pattern period (DRS Pattern Period)) from a frame SFN i+6 to a frame SFN i+7. In a communication system in which only the fixed discovery pattern (i.e., configuration #A) is supported, a problem of periodic interferences between adjacent cells (e.g., Small-Cell A, and Small-Cell C) may occur, as described in FIG. 1.

In exemplary embodiments of the present disclosure, a variable discovery pattern (i.e., configuration #B) may be further supported in addition to the fixed discovery pattern (i.e., configuration #A). In the variable discovery pattern (i.e., configuration #B), a discovery transmission period (DRS Tx Period) and a discovery pattern period (DRS Pattern Period) may not coincide. For example, because the discovery transmission window (DRS Tx Window) appears once every 20 ms in the variable discovery pattern (i.e., configuration #B) in FIG. 5, the discovery transmission period (DRS Tx Period) may be interpreted as 20 ms. However, a time interval between the first window ($1^{st}$ Win) of the frame SFN i corresponding to the first discovery transmission window (DRS Tx Window) and the second window ($2^{nd}$ Win) of the frame SFN i+2 corresponding to the second discovery transmission window (DRS Tx Window) is 25 ms, and the time interval between the second window ($2^{nd}$ Win) of the frame SFN i+2 corresponding to the second discovery transmission window (DRS Tx Window) and the first window ($1^{st}$ Win) of the frame SFN i+4 corresponding to the third discovery transmission window (DRS Tx Window) is 15 ms. Therefore, although the discovery transmission pattern is regular, it is difficult to consider that the discovery transmission period (DRS Tx Period) is 20 ms. Instead, the exemplary embodiments of the present disclosure introduce the concept of the discovery pattern period (i.e., DRS Pattern Period).

In the variable discovery pattern (i.e., configuration #B) in FIG. 5, the discovery pattern period (DRS Pattern Period) may be 40 ms, and one discovery pattern period (DRS Pattern Period) may include a discovery pattern first duration (DRS Pattern $1^{st}$ duration) of 20 ms and a discovery pattern second duration (DRS Pattern $2^{nd}$ duration) of 20 ms. A discovery pattern third duration (DRS Pattern $3^{rd}$ duration) in FIG. 5 may correspond to the discovery pattern first duration (DRS Pattern $1^{st}$ duration) in terms of repetition, and a discovery pattern fourth duration (DRS Pattern $4^{th}$ duration) may correspond to the discovery pattern second duration (DRS Pattern $2^{nd}$ duration) in terms of repetition.

In FIG. 5, each of the discovery pattern first duration (i.e., DRS Pattern $1^{st}$ duration), the discovery pattern second duration (i.e., DRS Pattern $2^{nd}$ duration), the discovery pattern third duration (i.e., DRS Pattern $3^{rd}$ duration), and the discovery pattern fourth duration (i.e., DRS Pattern $4^{th}$ duration) may include four windows (i.e., first window ($1^{st}$ Win), second window ($2^{nd}$ Win), third window ($3^{rd}$ Win), and fourth window ($4^{th}$ Win)). However, the exemplary embodiments of the present disclosure are not limited to such a case, and an exemplary embodiment in which any discovery pattern duration includes a first window to an N-th window is also possible. Here, N is a natural number equal to or greater than 2, and may be set according to the operation mode of the transmission node.

In the discovery pattern first duration (i.e., DRS Pattern $1^{st}$ duration) in the variable discovery pattern (i.e., configuration #B), among the four windows (i.e., first window ($1^{st}$ Win), second window ($2^{nd}$ Win), third window ($3^{rd}$ Win), and fourth window ($4^{th}$ Win)), the first window ($1^{st}$ Win) may correspond to the discovery transmission window (DRS Tx Window). In this case, in order to actually transmit a discovery burst in the first window ($1^{st}$ Win), an LBT should succeed before or during the first window. In the discovery pattern second duration (i.e., DRS Pattern $2^{nd}$ duration) in the variable discovery pattern (i.e., configuration #B), among the four windows (i.e., first window ($1^{st}$ Win), second window ($2^{nd}$ Win), third window ($3^{rd}$ Win), and fourth window ($4^{th}$ Win)), the second window ($2^{nd}$ Win) may correspond to the discovery transmission window (DRS Tx Window). In the discovery pattern third duration (i.e., DRS Pattern $3^{rd}$ duration) in the variable discovery pattern (i.e., configuration #B), the first window ($1^{st}$ Win) may again correspond to the discovery transmission window (DRS Tx Window). In the discovery pattern fourth duration (i.e., DRS Pattern $4^{th}$ duration) in the variable discovery pattern (i.e., configuration #B), the second window ($2^{nd}$ Win) may again correspond to the discovery transmission window (DRS Tx Window).

According to an exemplary embodiment of the present disclosure, the small cell A (Small-Cell A) may transmit the discovery burst according to the discovery pattern configuration #A of FIG. 5, and the small cell C (Small-Cell C) may transmit the discovery burst according to the discovery pattern configuration #B of FIG. 5. Accordingly, the discovery burst transmissions between adjacent cells can be randomized, so that the number of occurrences of interferences can be relatively reduced, and thus continuous and periodic LBT failures can be avoided. Meanwhile, when comparing the pattern of the positions of the synchronization signal blocks actually transmitted in the discovery transmission window (DRS Tx Window=>$1^{st}$ Win) of the discovery pattern first duration (DRS Pattern $1^{st}$ duration) with the pattern the of the positions of the synchronization signal blocks actually transmitted in the discovery transmission window (DRS Tx Window=>$2^{nd}$ Win) of the discovery pattern second duration (DRS Pattern $2^{nd}$ duration), the same regular position pattern may be repeated, or the same irregular position pattern may be repeated, as described in the description of FIG. 4. Alternatively, the same transmission pattern may not be repeated, and different position patterns may be applied to the respective discovery transmission windows.

FIGS. 6 to 11 are diagrams for describing discovery burst transmission according to another exemplary embodiment of the present disclosure.

Figure 6:
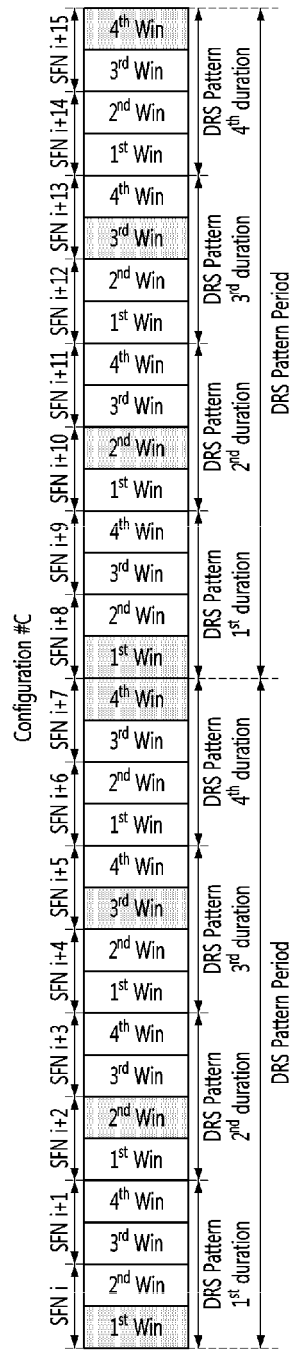
FIGS. 6 to 11 are diagrams for describing discovery burst transmission according to another exemplary embodiment of the present disclosure.

In a variable discovery pattern (configuration #C) of FIG. 6, in a discovery pattern first duration (DRS Pattern $1^{st}$ duration) including four windows (i.e., first window ($1^{st}$ Win), second window ($2^{nd}$ Win), third window ($3^{rd}$ Win), and fourth window ($4^{th}$ Win)), the first window ($1^{st}$ Win) may correspond to a discovery transmission window (DRS Tx Window). In a discovery pattern second duration (DRS Pattern $2^{nd}$ duration) including four windows (i.e., first window ($1^{st}$ Win), second window ($2^{nd}$ Win), third window ($3^{rd}$ Win), and fourth window ($4^{th}$ Win)), the second window ($2^{nd}$ Win) may correspond to a discovery transmission window (DRS Tx Window). In a discovery pattern third duration (DRS Pattern $3^{rd}$ duration) including four windows (i.e., first window ($1^{st}$ Win), second window ($2^{nd}$ Win), third window ($3^{rd}$ Win), and fourth window ($4^{th}$ Win)), the third window ($3^{rd}$ Win) may correspond to a discovery transmission window (DRS Tx Window). In a discovery pattern fourth duration (DRS Pattern $4^{th}$ duration) including four windows (i.e., first window ($1^{st}$ Win), second window ($2^{nd}$ Win), third window ($3^{rd}$ Win), and fourth window ($4^{th}$ Win)), the fourth window (4th Win) may correspond to a discovery transmission window (DRS Tx Window).

Figure 7:
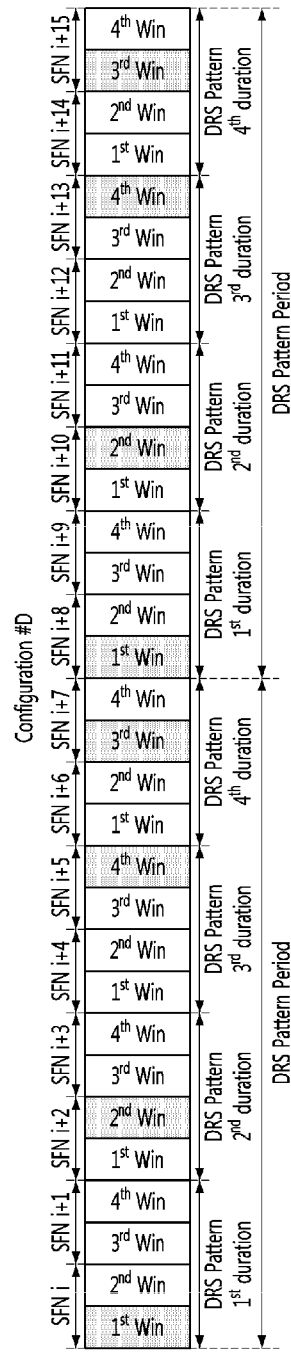

In a variable discovery pattern (configuration #D) of FIG. 7, in a discovery pattern first duration (DRS Pattern $1^{st}$ duration) including four windows (i.e., first window ($1^{st}$ Win), second window ($2^{nd}$ Win), third window ($3^{rd}$ Win), and fourth window ($4^{th}$ Win)), the first ($1^{st}$ Win) window may correspond to a discovery transmission window (DRS Tx Window). In a discovery pattern second duration (DRS Pattern $2^{nd}$ duration) including four windows (i.e., first window ($1^{st}$ Win), second window ($2^{nd}$ Win), third window ($3^{rd}$ Win), and fourth window ($4^{th}$ Win)), the second window ($2^{nd}$ Win) may correspond to a discovery transmission window (DRS Tx Window). In a discovery pattern third duration (DRS Pattern $3^{rd}$ duration) including four windows (i.e., first window ($1^{st}$ Win), second window ($2^{nd}$ Win), third window ($3^{rd}$ Win), and fourth window ($4^{th}$ Win)), the fourth window ($4^{th}$ Win) may correspond to a discovery transmission window (DRS Tx Window). In a discovery pattern fourth duration (DRS Pattern $4^{th}$ duration) including four windows (i.e., first window (1$^{st}$ Win), second window (2$^{nd}$ Win), third window (3$^{rd}$ Win), and fourth window (4$^{th}$ Win)), the third window (3$^{rd}$ Win) may correspond to a discovery transmission window (DRS Tx Window).

According to another exemplary embodiment of the present disclosure, the small cell A (Small-Cell A) may transmit the discovery burst according to the discovery pattern configuration #C of FIG. 6, and the small cell C (Small-Cell C) may transmit the discovery burst according to the discovery pattern configuration #D of FIG. 7. Accordingly, the discovery burst transmissions between adjacent cells can be randomized, so that the number of occurrences of interferences can be relatively reduced, and thus continuous and periodic LBT failures can be avoided.

Figure 8:
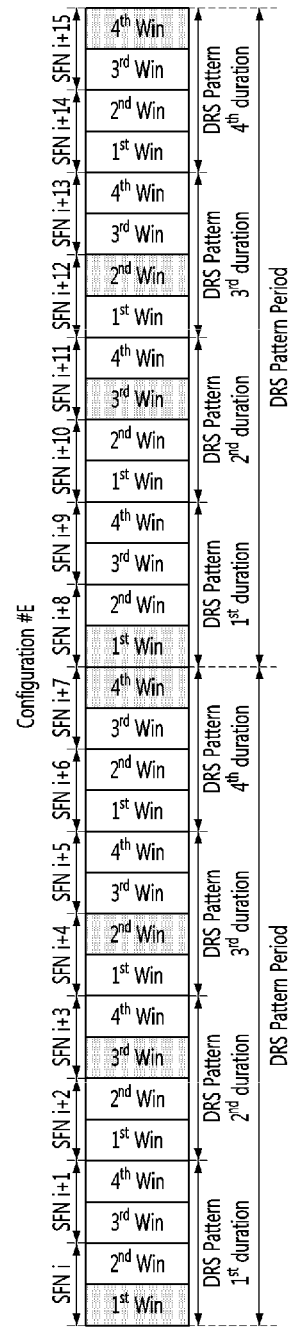

In a variable discovery pattern (configuration #E) of FIG. 8, the first window (1$^{st}$ Win) in the discovery pattern first duration (DRS Pattern 1$^{st}$ duration) may correspond to a discovery transmission window (DRS Tx Window), the third window (3rd Win) in the discovery pattern second duration (DRS Pattern 2$^{nd}$ duration) may correspond to a discovery transmission window (DRS Tx Window), the second window (2$^{nd}$ Win) in the discovery pattern third duration (DRS Pattern 3$^{rd}$ duration) may correspond to a discovery transmission window (DRS Tx Window), and the fourth window (4$^{th}$ Win) in the discovery pattern fourth duration (DRS Pattern 4$^{th}$ duration) may correspond to a discovery transmission window (DRS Tx Window).

Figure 9:
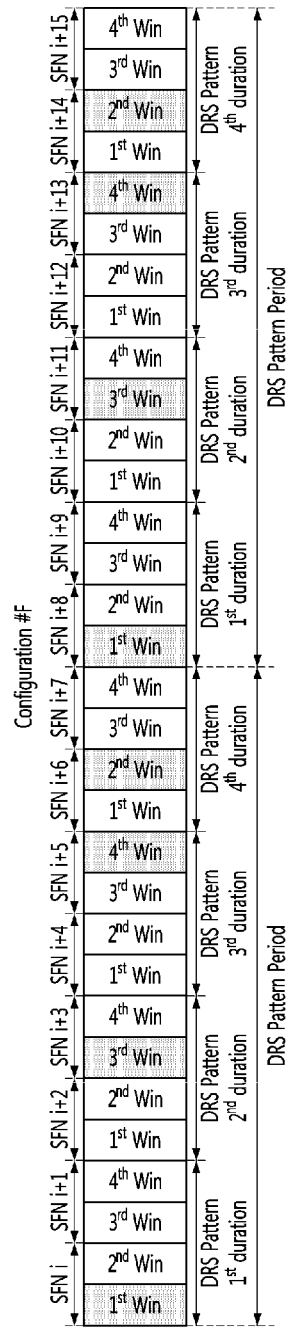

In a variable discovery pattern (configuration #F) of FIG. 9, the first window (1$^{st}$ Win) in the discovery pattern first duration (DRS Pattern 1$^{st}$ duration) may correspond to a discovery transmission window (DRS Tx Window), the third window (3rd Win) in the discovery pattern second duration (DRS Pattern 2$^{nd}$ duration) may correspond to a discovery transmission window (DRS Tx Window), the fourth window (4$^{th}$ Win) in the discovery pattern third duration (DRS Pattern 3$^{rd}$ duration) may correspond to a discovery transmission window (DRS Tx Window), and the second window (2$^{nd}$ Win) in the discovery pattern fourth duration (DRS Pattern 4$^{th}$ duration) may correspond to a discovery transmission window (DRS Tx Window).

Figure 10:
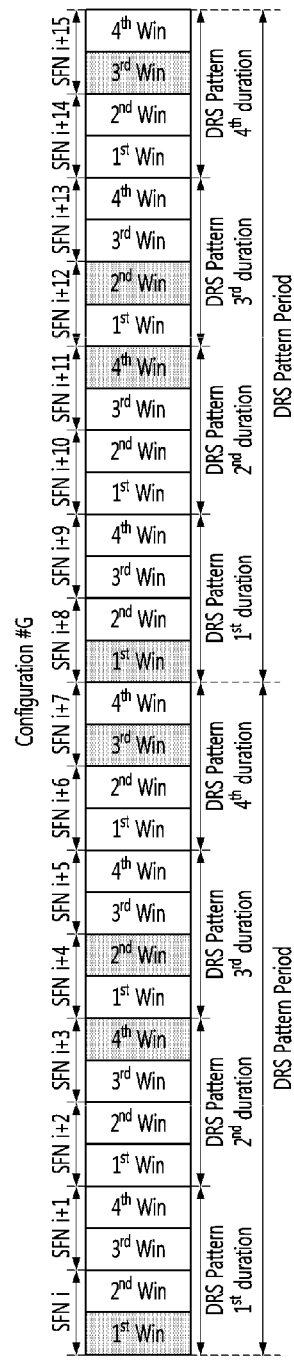

In a variable discovery pattern (configuration #G) of FIG. 10, the first window (1$^{st}$ Win) in the discovery pattern first duration (DRS Pattern 1$^{st}$ duration) may correspond to a discovery transmission window (DRS Tx Window), the fourth window (4$^{th}$ Win) in the discovery pattern second duration (DRS Pattern 2$^{nd}$ duration) may correspond to a discovery transmission window (DRS Tx Window), the second window (2$^{nd}$ Win) in the discovery pattern third duration (DRS Pattern 3$^{rd}$ duration) may correspond to a discovery transmission window (DRS Tx Window), and the third window (3$^{rd}$ Win) in the discovery pattern fourth duration (DRS Pattern 4$^{th}$ duration) may correspond to a discovery transmission window (DRS Tx Window).

Figure 11:
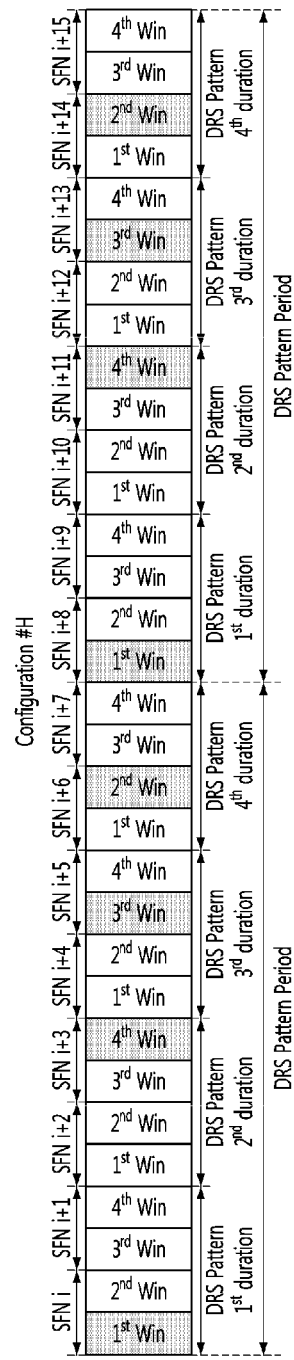

In a variable discovery pattern (configuration #H) of FIG. 11, the first window (1$^{st}$ Win) in the discovery pattern first duration (DRS Pattern 1$^{st}$ duration) may correspond to a discovery transmission window (DRS Tx Window), the fourth window (4$^{th}$ Win) in the discovery pattern second duration (DRS Pattern 2$^{nd}$ duration) may correspond to a discovery transmission window (DRS Tx Window), the third window (3$^{rd}$ Win) in the discovery pattern third duration (DRS Pattern 3$^{rd}$ duration) may correspond to a discovery transmission window (DRS Tx Window), and the second window (2$^{nd}$ Win) in the discovery pattern fourth duration (DRS Pattern 4$^{th}$ duration) may correspond to a discovery transmission window (DRS Tx Window)

In FIGS. 6 to 11, if the second window is interpreted not as just the 2$^{nd}$ Win that comes just after the first window 1$^{st}$ Win but as any one of 2$^{nd}$ Win, 3$^{rd}$ Win, 4$^{th}$ Win other than the first window 1$^{st}$ Win within the discovery pattern duration, the exemplary embodiments of FIGS. 6 to 11 and the exemplary embodiments of FIG. 5 may be expressed with the same technical characteristics. That is, channel sensing for the shared band may be performed to transmit the discovery burst through the first window (1$^{st}$ Win) of the discovery pattern first duration (DRS Pattern 1$^{st}$ duration) including the first window to N-th window (N is a natural number greater than or equal to 2), and when it is determined that the shared band is in an idle state, the discovery burst may be transmitted through the first window (1$^{st}$ Win) of the discovery pattern first duration (DRS Pattern 1$^{st}$ duration). Then, channel sensing for the shared band may be performed to transmit the discovery burst through the second window (one of 2$^{nd}$ Win, 3$^{rd}$ Win, 4$^{th}$ Win) of the discovery pattern second duration (DRS Pattern 2$^{nd}$ duration) including first window to N-th window, and when it is determined that the shared band is in the idle state, the discovery burst may be transmitted through the second window (one of 2$^{nd}$ Win, 3$^{rd}$ Win, 4$^{th}$ Win) of the discovery pattern second duration (DRS Pattern 2$^{nd}$ duration). When transmitting the discovery burst in the shared band, the transmission node may transmit the discovery burst through the first window (1$^{st}$ Win) in the discovery pattern first duration (DRS Pattern 1$^{st}$ duration) and transmit the discovery burst through the second window (one of 2$^{nd}$ Win, 3$^{rd}$ Win, 4$^{th}$ Win) other than the first window (1$^{st}$ Win) in the discovery pattern second duration (DRS Pattern 2$^{nd}$ duration), so that the transmission node can give less continuous/periodic LBT interferences to other transmission nodes.

Figure 12:
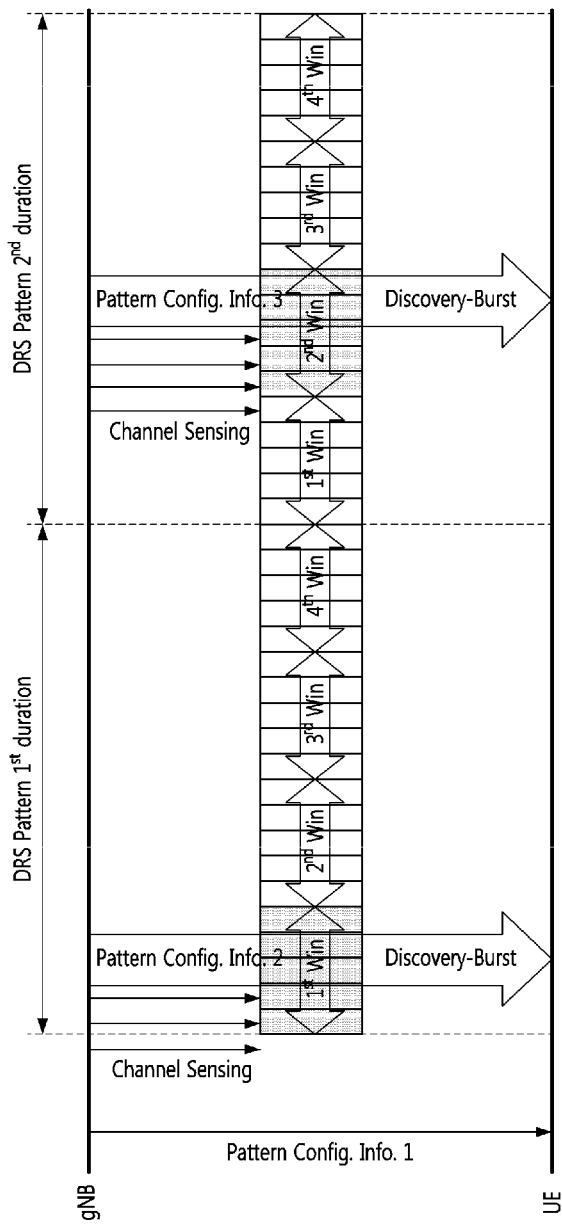
FIG. 12 is a diagram illustrating discovery burst transmission between a transmission node and a reception node.

FIG. 12 is a diagram illustrating discovery burst transmission between a transmission node and a reception node.

In downlink transmission, a base station may correspond to a transmission node and a terminal may correspond to a reception node. In uplink transmission, the terminal may correspond to a transmission node and the base station may correspond to a reception node. In case of Device to Device (D2D) transmission, Vehicle to Everything (V2X) transmission, or Sidelink transmission, a device or apparatus that transmits a signal may correspond to a transmission node, and a device or apparatus that receives the signal may correspond to a reception node. Hereinafter, the downlink transmission will be described as an example, but the exemplary embodiments of the present disclosure are not limited to the downlink transmission, but may be applied to the uplink transmission, the D2D transmission, the V2X transmission, the Sidelink transmission, and the like.

First, the transmission node (e.g., gNB) in the downlink transmission may select any one discovery pattern among the fixed discovery pattern and one or more variable discovery patterns. For example, when LBTs for discovery burst transmission periodically fail during a certain time period, the transmission node may select a variable discovery pattern. The transmission node may transmit configuration information for the selected variable discovery pattern to the reception node. Alternatively, the configuration information may be transmitted using a broadcast scheme or a multicast scheme. The transmission node may separately transmit the configuration information (e.g., Pattern Config. Info. 1) for the variable discovery pattern to the reception node (e.g., UE) in advance, or transmit the configuration information (e.g., Pattern Config. Info. 2 or Pattern Config. Info. 3) for the variable discovery pattern to the reception node (e.g., UE) together with a discovery burst (e.g., Discovery-Burst). Here, the configuration information (e.g., Pattern Config. Info. 1, Pattern Config. Info. 2, and Pattern Config. Info. 3) for the variable discovery pattern may indicate which one of the first window to N-th window is the discovery transmission window (DRS Tx Window) for each discovery pattern duration. In addition, the configuration information (e.g., Pattern Config. Info. 1, Pattern Config. Info. 2, and Pattern Config. Info. 3) for the variable discovery pattern may indicate which one variable discovery pattern among FIGS. 5 to 11 is used.

The transmission node may perform first channel sensing for the shared band to transmit the discovery burst through the first window (i.e., $1^{st}$ Win) of the discovery pattern first duration (DRS Pattern $1^{st}$ duration), and when the shared band is determined to be in the idle state, the transmission node may transmit the discovery burst through the first window (i.e., $1^{st}$ Win) of the discovery pattern first duration (DRS Pattern $1^{st}$ duration). Then, the transmission node may perform second channel sensing for the shared band to transmit the discovery burst through the second window (i.e., $2^{nd}$ Win) of the discovery pattern second duration (DRS Pattern $2^{nd}$ duration), and when the shared band is determined to be in the idle state, the transmission node may transmit the discovery burst through the second window (i.e., $2^{nd}$ Win) of the discovery pattern second duration (DRS Pattern $2^{nd}$ duration).

Figure 13:
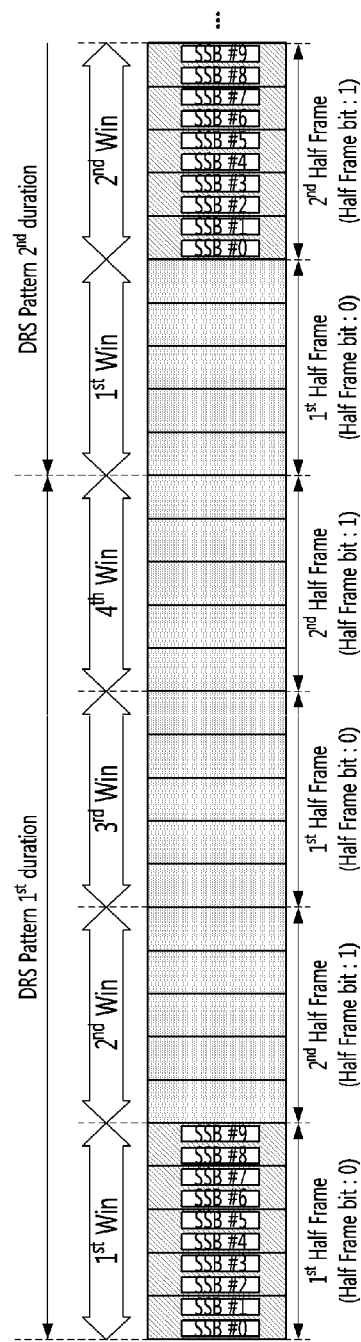
FIG. 13 is a diagram for describing a half frame indication value.

FIG. 13 is a diagram for describing a half frame indication value.

In FIG. 13, when the reception node (e.g., UE) receives the discovery burst through the first window (i.e., $1^{st}$ Win) of the discovery pattern first duration (DRS pattern $1^{st}$ duration), a half frame indication value (i.e., Half Frame bit) obtained from the corresponding discovery burst may be 0. In FIG. 13, when the reception node (e.g., UE) receives the discovery burst through the second window (i.e., $2^{nd}$ Win) of the discovery pattern second duration (DRS pattern $2^{nd}$ duration), the half frame indication value (i.e., Half Frame bit) obtained from the corresponding discovery burst may be 1. Of course, it is also possible to set the bit value in reverse. As described above, according to an exemplary embodiment of the present disclosure, the half frame indication value obtained from the discovery burst received in the first window (i.e., $1^{st}$ Win) of the discovery pattern first duration (DRS pattern $1^{st}$ duration) may be different from the half frame indication value obtained from the discovery burst received in the second window (i.e., $2^{nd}$ Win) of the discovery pattern second duration (DRS Pattern $2^{nd}$ duration). From the reception node's point of view, a system frame number (SFN) may be obtained from the received discovery burst to identify a correct frame position, and the half frame indication value may be obtained from the received discovery burst to identify whether the discovery transmission timing is a first half frame ($1^{st}$ Half Frame) or a second half frame ($2^{nd}$ Half Frame). Also, an SSB index (e.g., #0 to #9) may be obtained from the received discovery burst to identify a correct slot/symbol timing. In addition, the reception node may receive the discovery pattern configuration information (e.g., Pattern Config. Info. 1, Pattern Config. Info. 2, and Pattern Config. Info. 3) transmitted by the transmission node, identify a certain timing pattern in which the discovery burst is transmitted, predict timing of the subsequent discovery burst transmission, and perform monitoring operations at the corresponding time.

For example, the reception node receiving the configuration information for the variable discovery pattern from the transmission node may monitor the first window (i.e., $1^{st}$ Win) of the discovery pattern first duration (DRS pattern $1^{st}$ duration) including the first window to N-th window to receive the discovery burst. In addition, the reception node may monitor the second window (i.e., $2^{nd}$ Win) of the discovery pattern second duration (DRS pattern $2^{nd}$ duration) including the first window to N-th window to receive the discovery burst. In this case, the half frame indication value obtained from the discovery burst received in the first window (i.e., $1^{st}$ Win) of the discovery pattern first duration (DRS pattern $1^{st}$ duration) may be different from the half frame indication value obtained from the discovery burst received in the second window (i.e., $2^{nd}$ Win) of the discovery pattern second duration (DRS Pattern $2^{nd}$ duration). Here, the configuration information for the variable discovery pattern may indicate which one of the first window to N-th window is the discovery transmission window (DRS Tx Window) for each discovery pattern duration. In addition, the configuration information for the variable discovery pattern may indicate one among the various variable discovery patterns.

Figure 14:
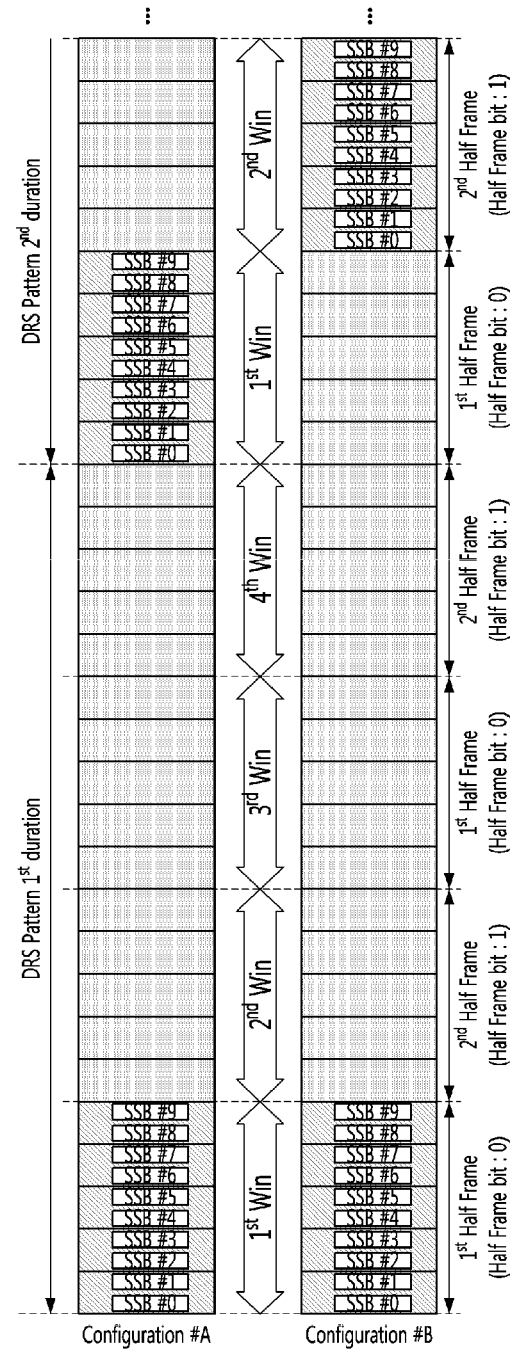
FIG. 14 is a diagram for comparing a fixed discovery pattern and a variable discovery pattern in detail.

FIG. 14 is a diagram for comparing a fixed discovery pattern and a variable discovery pattern in detail.

In the case of the fixed discovery pattern (i.e., configuration #A), the transmission node may attempt to transmit the discovery burst through the first window (i.e., $1^{st}$ Win) in the discovery pattern first duration (DRS Pattern $1^{st}$ duration), and attempt to transmit the discovery burst through the first window (i.e., $1^{st}$ Win) also in the discovery pattern second duration (DRS Pattern $2^{nd}$ duration). In the case of the variable discovery pattern (i.e., configuration #B) according to an exemplary embodiment of the present disclosure, the transmission node may attempt to transmit the discovery burst through the first window (i.e., $1^{st}$ Win)) in the discovery pattern first duration (DRS Pattern $1^{st}$ duration), and attempt to transmit the discovery burst through the second window (i.e., $2^{nd}$ Win) in the discovery pattern second duration (DRS Pattern $2^{nd}$ duration).

The prior arts US 2019/0090210, US 2019/0081721, etc. are for a fixed discovery pattern, and present a synchronization signal block (SSB) pattern in units of slots, symbols, or groups arranged within one window of a discovery pattern duration. In the case of the fixed discovery pattern (i.e., window fixed pattern), because the window in which transmission of the synchronization signal block (SSB) pattern is attempted is fixed to any one window with respect to all discovery pattern durations, as the attempt window for transmission of the SSB pattern is fixed to the first window ($1^{st}$ Win) with respect to both the discovery pattern first duration (DRS Pattern $1^{st}$ duration) and the discovery pattern second duration (DRS Pattern $2^{nd}$ duration) in Configuration #A of FIG. 14, a problem of periodic/continuous interferences between adjacent cells may occur. In the variable discovery pattern (i.e., window variable pattern or window alternating pattern) according to an exemplary embodiment of the present disclosure, as in the variable discovery pattern (i.e., configuration #B) of FIG. 14, the window in which the transmission node attempts to transmit a discovery burst may vary for each discovery pattern duration, the problem of periodic/continuous interferences between adjacent cells can be reduced or avoided.

Figure 15:
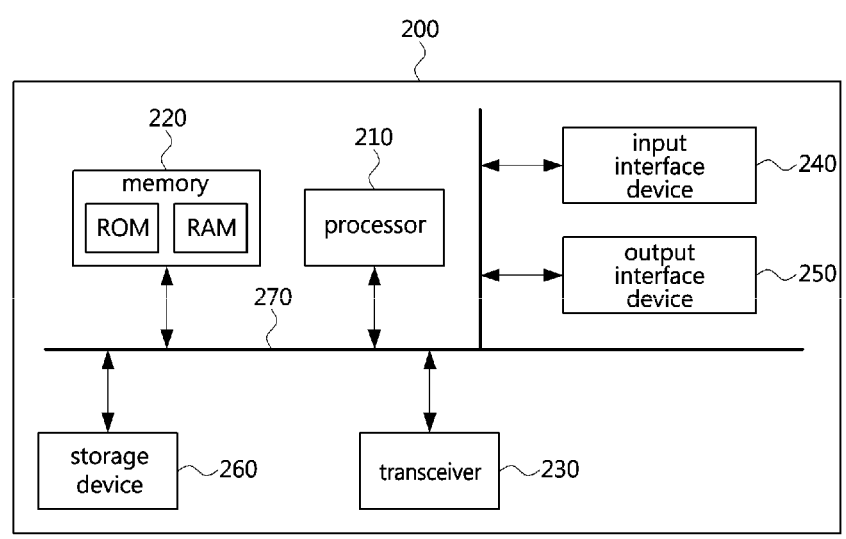
FIG. 15 is a block diagram illustrating an exemplary embodiment of a communication node.

FIG. 15 is a block diagram illustrating an exemplary embodiment of a communication node.

A communication node 200 shown in FIG. 15 may be a transmission node that executes a discovery transmission method according to an exemplary embodiment of the present disclosure. In addition, the communication node 200 shown in FIG. 15 may be a reception node that executes a discovery reception method according to another exemplary embodiment of the present disclosure.

Referring to FIG. 15, a communication node 200 may include at least one processor 210, a memory 220, and a transceiver 230 connected to a network to perform communication. In addition, the communication node 200 may further include an input interface device 240, an output interface device 250, a storage device 260, and the like. The components included in the communication node 200 may be connected by a bus 270 to communicate with each other. However, each component included in the communication node 200 may be connected to the processor 210 through a separate interface or a separate bus instead of the common bus 270. For example, the processor 210 may be connected to at least one of the memory 220, the transceiver 230, the input interface device 240, the output interface device 250, and the storage device 260 through a dedicated interface.

The processor 210 may execute at least one instruction stored in at least one of the memory 220 and the storage device 260. The processor 210 may refer to a central processing unit (CPU), a graphics processing unit (GPU), or a dedicated processor on which the methods according to the exemplary embodiments of the present invention are performed. Each of the memory 220 and the storage device 260 may be configured as at least one of a volatile storage medium and a nonvolatile storage medium. For example, the memory 220 may be configured with at least one of a read only memory (ROM) and a random access memory (RAM).

For example, the transmission node 200 in the downlink transmission, the uplink transmission, the D2D transmission, V2X transmission, or the Sidelink transmission may comprise the processor 210 and the memory 220. The processor 210 may execute program instructions stored in the memory 220. When the program instructions are executed, the transmission node 200 may perform first channel sensing for a shared band, and when it is determined that the shared band is in the idle state based on the first channel sensing, the transmission node 200 may transmit discovery burst through the first window (1$^{st}$ Win) of the discovery pattern first duration (DRS Pattern 1$^{st}$ duration) including the first window to N-th window (N is a natural number equal to or greater than 2). In addition, the transmission node 200 may perform second channel sensing for the shared band, and when it is determined that the shared band is in the idle state based on the second channel sensing, the transmission node 200 may transmit discovery burst through the second window (2$^{nd}$ Win) of the discovery pattern second duration (DRS Pattern 2$^{nd}$ duration) including first window to N-th window.

The exemplary embodiments of the present disclosure are not implemented only through the system or method described above, and may be implemented through a program that realizes functions corresponding to the corresponding technical configuration or a recording medium in which the program is recorded. Although the exemplary embodiments of the present disclosure have been described in detail above, the scope of the present disclosure is not limited thereto, and those skilled in the art can equally modify, change, and replace based on technical ideas defined in the following claims, and the modified, changed, or replaced claims are also included in the scope of the present disclosure.

What is claimed is:

1. A method for a transmission node to transmit a discovery burst in a shared band, the method comprising:
   performing first channel-sensing with respect to the shared band to transmit the discovery burst through a first window of a discovery pattern first duration including the first window to an N-th window, N being a natural number equal to or greater than 2;
   in case that the shared band is determined to be not-occupied based on the first channel-sensing, transmitting the discovery burst through the first window of the discovery pattern first duration;
   performing second channel-sensing with respect to the shared band to transmit the discovery burst through a second window of a discovery pattern second duration including the first window to N-th window; and
   in case that the shared band is determined to be not-occupied based on the second channel-sensing, transmitting the discovery burst through the second window of the discovery pattern second duration,
   wherein the discovery burst is not transmitted through the first window of the discovery pattern second duration although the shared band is not-occupied during the first window of the discovery pattern second duration.

2. The method of claim 1, further comprising:
   selecting a variable discovery pattern between a fixed discovery pattern and the variable discovery pattern.

3. The method of claim 2, further comprising:
   transmitting configuration information on the variable discovery pattern to a reception node.

4. The method of claim 3, wherein the configuration information on the variable discovery pattern indicates which window is a discovery transmission window among the first window to the N-th window.

5. The method of claim 1, wherein the discovery burst includes at least one discovery signal unit, and the discovery signal unit includes at least one SSB (synchronization signal block).

6. The method of claim 5, wherein the SSB includes a primary synchronization signal (PSS), a secondary synchronization signal (SSS), a physical broadcast channel (PBCH), and a PBCH-demodulation reference signal (PBCH-DMRS).

7. A method for a transmission node to transmit a discovery burst in a shared band, the method comprising:
   performing first channel-sensing with respect to the shared band to transmit the discovery burst through a first window of a discovery pattern first duration including the first window to an N-th window, N being a natural number equal to or greater than 2;
   in case that the shared band is determined to be not-occupied based on the first channel-sensing, transmitting the discovery burst through the first window of the discovery pattern first duration;
   performing second channel-sensing with respect to the shared band to transmit the discovery burst through a second window of a discovery pattern second duration including the first window to N-th window;
   in case that the shared band is determined to be not-occupied based on the second channel-sensing, transmitting the discovery burst through the second window of the discovery pattern second duration;
   performing third channel-sensing with respect to the shared band to transmit the discovery burst through a first window of a discovery pattern third duration including the first window to N-th window; and
   in case that the shared band is determined to be not-occupied based on the third channel-sensing, transmitting the discovery burst through the first window of the discovery pattern third duration.

8. The method of claim 7, further comprising:
performing fourth channel-sensing with respect to the shared band to transmit the discovery burst through a second window of a discovery pattern fourth duration including first window to N-th window; and
in case that the shared band is determined to be not-occupied based on the fourth channel-sensing, transmitting the discovery burst through the second window of the discovery pattern fourth duration.

9. A method for a reception node to receive a discovery burst in a shared band, the method comprising:
receiving configuration information on a variable discovery pattern from a transmission node;
monitoring a first window of a discovery pattern first duration including the first window to an N-th window to receive the discovery burst during the discovery pattern first duration, N being a natural number equal to or greater than 2;
monitoring a second window of a discovery pattern second duration including the first window to N-th window to receive the discovery burst during the discovery pattern second duration; and
monitoring a first window of a discovery pattern third duration including the first window to N-th window to receive the discovery burst during the discovery pattern third duration.

10. The method of claim 9, wherein the configuration information on the variable discovery pattern indicates which window is a discovery transmission window among the first window to the N-th window.

11. A method for a reception node to receive a discovery burst in a shared band, the method comprising:
receiving configuration information on a variable discovery pattern from a transmission node;
monitoring a first window of a discovery pattern first duration including the first window to an N-th window to receive the discovery burst during the discovery pattern first duration, N being a natural number equal to or greater than 2; and
monitoring a second window of a discovery pattern second duration including the first window to N-th window to receive the discovery burst during the discovery pattern second duration,
wherein a half frame indication value obtained from the discovery burst received during the first window of the discovery pattern first duration is different from a half frame indication value obtained from the discovery burst received during the second window of the discovery pattern second duration.

12. A transmission node transmitting a discovery burst in a shared band, the transmission node comprising:
a processor; and
a memory storing a program command, the processor executing the program command to cause the transmission node to:
perform first channel-sensing with respect to the shared band;
in case that the shared band is determined to be not-occupied based on the first channel-sensing, transmit the discovery burst through a first window of a discovery pattern first duration including the first window to an N-th window, N being a natural number equal to or greater than 2;
perform second channel-sensing with respect to the shared band; and
in case that the shared band is determined to be not-occupied based on the second channel-sensing, transmit the discovery burst through a second window of a discovery pattern second duration including first window to N-th window,
wherein the discovery burst is transmitted through different windows in each of the discovery pattern first duration and the discovery pattern second duration.

13. The transmission node of claim 12,
wherein the processor executes the program command to further cause the transmission node to select a discovery pattern between a fixed discovery pattern and a variable discovery pattern,
wherein when the variable discovery pattern is used, the discovery burst is transmitted through different windows in each of the discovery pattern first duration and the discovery pattern second duration, and
wherein when the fixed discovery pattern is used, the discovery burst is transmitted through a same window in each of the discovery pattern first duration and the discovery pattern second duration.

* * * * *